United States Patent [19]
Reiser et al.

[11] Patent Number: 6,115,702
[45] Date of Patent: Sep. 5, 2000

[54] AUTOMATIC DETERMINATION OF REPORT GRANULARITY

[75] Inventors: Kurt Reiser, Torrance; Yang Chen, Westlake Village, both of Calif.

[73] Assignee: Hughes Electronics Corporation

[21] Appl. No.: 08/998,402

[22] Filed: Dec. 23, 1997

[51] Int. Cl.[7] .................................................. G06F 15/00
[52] U.S. Cl. .............................. 706/62; 702/38; 382/103; 382/141
[58] Field of Search ................................ 706/62; 702/38; 382/103, 141

[56] References Cited

U.S. PATENT DOCUMENTS

| | | | |
|---|---|---|---|
| 4,519,041 | 5/1985 | Fant et al. | 382/141 |
| 5,339,256 | 8/1994 | Levy et al. | 702/38 |
| 5,963,653 | 10/1999 | McNary et al. | 382/103 |

OTHER PUBLICATIONS

Recognition of speaker–dependent continuous speech with KEAL; Mercier, G.; Bigorgne, D.; Miclet, L.; Le Guennec, L.; Querre, M.; Communications, Speech and Vision, IEE Proceedings I [see also; IEE Proceedings–Communications]; vol.: 136 2, Apr. 1989.

Contextual classification and segmentation of textured images; Fung, P.W., Grebbin, G.; Attikiouzel, Y.; Acoustics, Speech, and Signal Processing, 1990. ICASSP–90.,; 1990 International Conference on, 1990, pp.: 2329–2332; vol. 4.

*Primary Examiner*—Kevin J. Teska
*Assistant Examiner*—Edward G. Brown
*Attorney, Agent, or Firm*—V. D. Duraiswamy; M. W. Sales

[57] ABSTRACT

The present invention provides a method of performing statistical classification that can resolve conflict in independent sources of information, thereby creating a robust statistical classifier that has superior performance to classifiers currently available. Additionally, the present invention is automatically trainable, yielding improved classification performance. The present invention may be embodied in a method of statistically classifying events or objects, including the steps of gathering sets of information representative of features of an object or event; creating basic probability assignments based on said sets of information; determining a coarse information set from said sets of information; performing coarsening on said sets of information; performing linear superposition on each feature; and combining all features to reach a conclusion.

9 Claims, 2 Drawing Sheets

AUTOMATIC DETERMINATION OF REPORT GRANULARITY

BACKGROUND OF THE INVENTION (a) Field of the Invention

The present invention generally pertains to statistical classifiers and, more specifically, to a method for improving the performance of statistical classifiers.

(b) Description of Related Art

Statistical classifiers attempt to classify objects or events into categories based on information provided from information sources observing the object or event. Historically, statistical classifiers have been used in applications such as financial engineering and expert systems. Other applications of statistical classifiers include target recognition situations.

Traditionally, Bayesian probability calculus, which is well known, has been used to construct statistical classifiers. Classical Bayesian techniques allow inferences to be made based on information from information sources. Bayesian techniques work well when representative statistics (i.e., data representing a real situation) are available to be used when training the classifier. In many real-world situations there are either no representative statistics available to be used for training, or the statistics available are unreliable. This eliminates the opportunity to train the classifier adequately for a particular application. Also, insufficient or inaccurate prior statistics can cause conflict in the statistical classifier. If the statistical classifier relies on Bayesian probability calculus, the conflict may cause the classifier to become unstable.

Often it is advantageous to combine independent sources of information to enable the classifier to make more inferences as to the identity of the object or event being observed. However, when multiple information sources are used (as is typically the case) there may be conflict between the information sources. As previously noted, conflicting information may seriously de-stabilize a statistical classifier that employs the Bayesian technique, leading to inaccurate conclusions by the classifier.

Consider a target recognition scenario wherein there are two target types (t1 and t2) and two decoy types (d1 and d2). Three sensors (sensor 1, sensor 2, and sensor 3) may be used to provide information in an effort to determine the identity of an object which is observed. Sensor 1 may report $\mu 1(t1)=1$, meaning that sensor 1 has 100% confidence that the object under observation is t1. However, it may be the case that sensor 2 reports $\mu 2(d2)=1$, meaning that sensor 2 has 100% confidence that the object being observed is d2. Furthermore, it may be the case that sensor 3 reports $\mu 3(t1)=1$. Two of the three sources agree while a third is in conflict. Conflicting sources of information will confuse the statistical classifier because the classifier has no idea which piece of information is accurate.

Therefore, there is a need for a statistical classifier that can resolve conflict in independent sources of information, thus creating a robust classifier that has superior performance to classifiers currently available. Additionally, there is a need for a statistical classifier which does not need entirely reliable prior statistics.

SUMMARY OF THE INVENTION

The present invention provides a method of performing statistical classification that can resolve conflict in independent sources of information, thereby creating a robust statistical classifier that has superior performance to classifiers currently available. Additionally, the present invention is automatically trainable, yielding improved classification performance. The present invention may be embodied in a method of statistically classifying events or objects, including the steps of gathering sets of information representative of features of an object or event; creating basic probability assignments based on said sets of information; determining a coarse information set from said sets of information; coarsening said sets of information; performing linear superposition on each information source; and combining all coarsened reports to reach a conclusion.

The invention itself, together with further objects and attendant advantages, will best be understood by reference to the following detailed description, taken in conjunction with the accompanying drawings.

DESCRIPTION OF THE PREFERRED EMBODIMENTS

The Dempster-Shafer theory of evidential reasoning, which is known to those skilled in the art, provides means of combining information from different, and possibly contradictory, sources. The Dempster-Shafer theory uses explicit representations of ignorance and conflict to avoid the shortcomings of classical Bayesian probability calculus. Dempster-Shafer theory uses belief functions (also called basic probability assignments or bpa's), which are generalizations of discrete probability functions used in Bayesian probability calculus. In Dempster-Shafer theory, bpa's represent the distribution of probability mass in a system (i.e, how strongly something is believed, based on the information that has been provided).

The present invention uses the Dempster-Shafer theory of evidential reasoning to explicitly measure the conflict between sources of information. The measurement of conflict is used to control the level of abstraction at which each information source reports.

For example, consider the previously discussed scenario, including three sensors, and four possible objects (t1, t2, d1, and d2). Sensor 1 may be able to distinguish between t1 and t2, but confuses d1 and d2. Sensor 2 may be exactly opposite, that is, sensor 2 may distinguish between d1 and d2, but confuses t1 and t2. Sensor 3 may confuse t1 and t2 while also confusing d1 and d2. By measuring the conflict between pieces of information for each sensor, the granularity at which the sensors report may be changed. For example, considering the three sensors previously discussed, if each sensor reports at its finest level, the choice set for each sensor is $\{\{t1\}, \{t2\}, \{d1\}, \{d2\}\}$. However, it may be advantageous to view sensor outputs at a lower level of granularity (i.e., coarser granularity). This is done by modifying the choice set of each sensor appropriately. Consider sensor 1, reporting conflict is reduced when the granularity of the sensor choice set is reduced to $\{\{t1\}, \{t2\}, \{d1, d2\}\}$, where $\{d1, d2\}$ is referred to as a coarse set. In grouping the two decoy components together no information is lost since, as was previously assumed, sensor 1 confuses the decoy terms. The granularity for each sensor may be modified in a similar manner. Continuing with the scenario previously set forth, the choice set for sensor 2 will reduce to $\{\{t1, t2\}, \{d1\}, \{d2\}\}$, while the choice set for sensor 3 will reduce to {{t1, t2}, {d1, d2}}. In each case, the set of terms that are grouped together are referred to as the coarse set. The concept is that each sensor should report information as precise as possible, but not more precise than capable. This method of reducing the granularity (or coarsening) of sensor reports reduces conflict in the information presented to the statistical classifier, hence improving the performance of the classifier.

Figure 1:
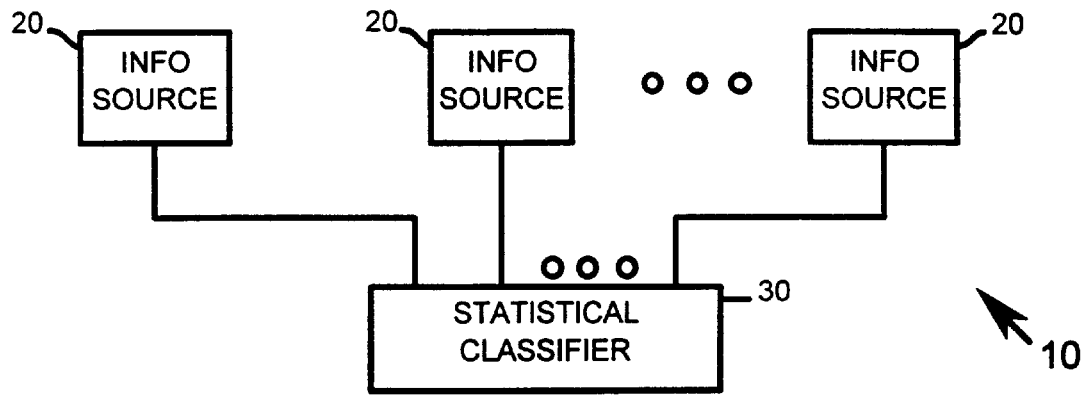
FIG. 1 is a diagram representing a hardware configuration that may be used with the present invention.

Referring now to FIG. 1, a classification system 10 is shown. The classification system 10 includes several information sources 20 and a statistical classifier 30. The information sources 20 may take a wide variety of forms including sensors capable of sensing an object or event and reporting information to the statistical classifier 30. Alternatively, the information sources 20 may be rules or opinions gathered from individuals, typically experts. The outputs of the information sources 20 are signals, which represent the event being observed. The outputs of the information sources 20 are coupled to the statistical classifier 30, which generates bpa's based on provided information and executes software implementing the method of the present invention.

Figure 2:
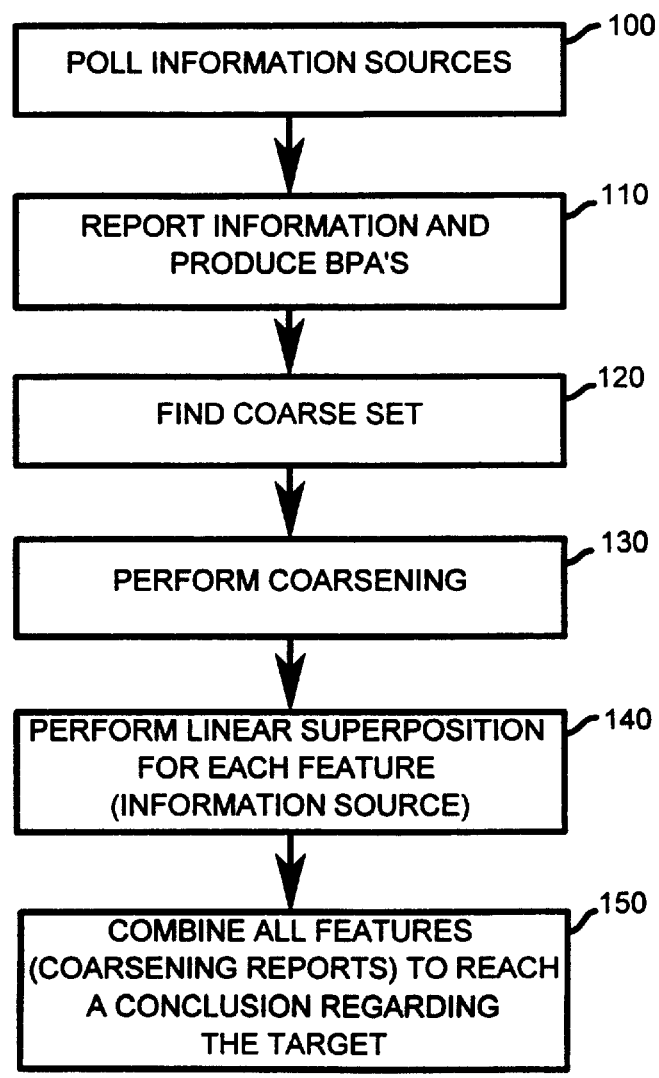
FIGS. 2–3 are flow diagrams representing the method of the present invention.
Figure 3:
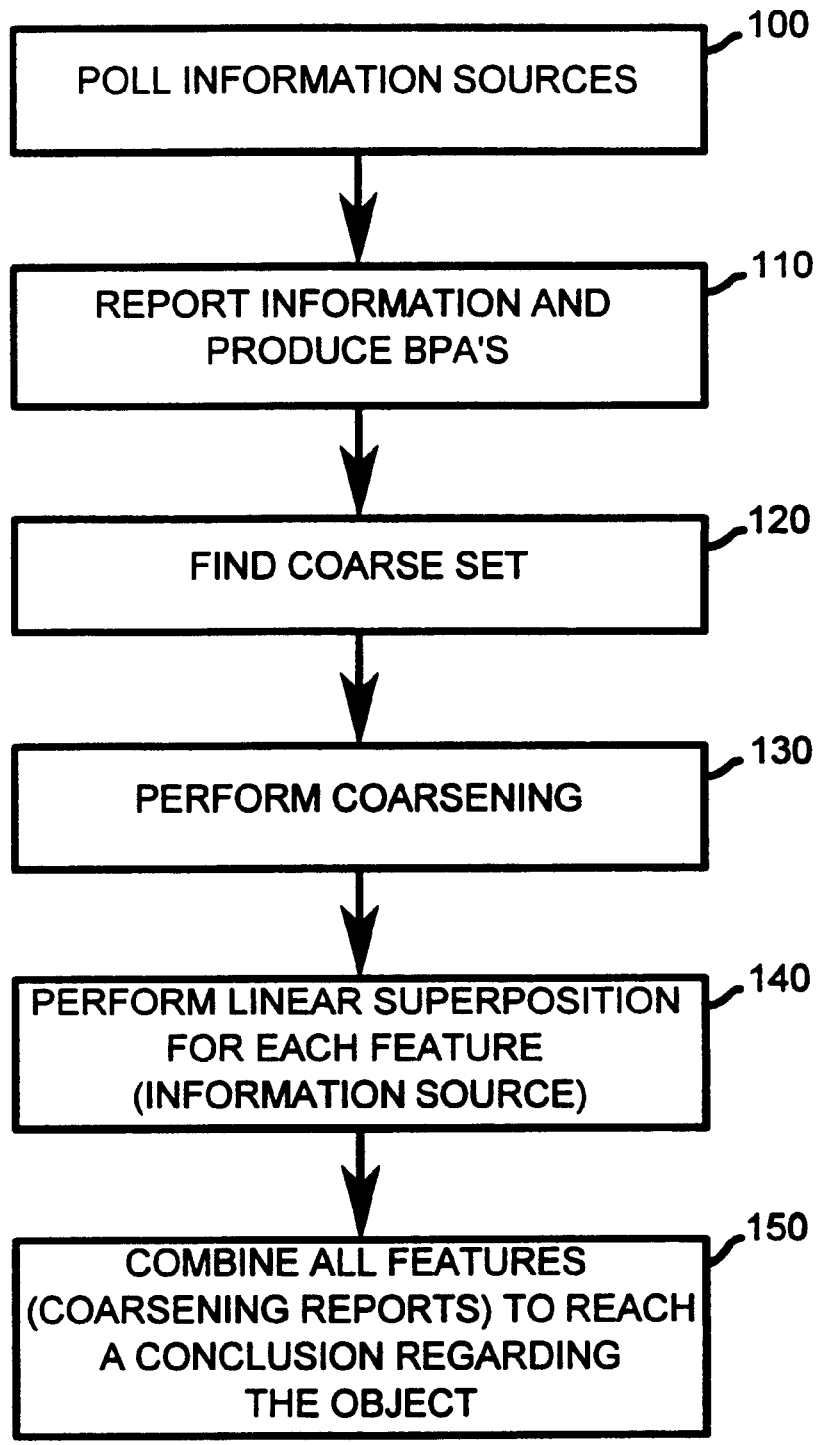

FIG. 2 is a flow diagram of a method embodying the present invention. The illustrated method is executed by the statistical classifier 30, which may be implemented as a traditional computer or workstation terminal. As shown in FIG. 2, at block 100 the method polls the information sources 20 to extract information. The extracted information is used to generate a belief function, or bpa for each information source. The output of each information source 20 is representative of an observation, a rule, an opinion, or some other measurable phenomenon. Block 110 performs the function of gathering the information reported by the information sources 20 and processing the information into bpa's. For example consider three bpa's $\mu 1$, $\mu 2$, and $\mu 3$. The bpa $\mu 1$ may be based on object shape, $\mu 2$ may be based on object size, while a third bpa $\mu 3$ may be based on the heat associated with the object.

After the information from the sources has been gathered and processed into bpa's, block 120 performs the function of determining the coarse set. The idea of forming coarse sets is based on the conflict between reports taken from pairs of information sources. Specifically, equation (1) below defines the conflict operation, which will yield the conflict between two sources of information.

$$c12(A) = (\mu 1 \star \mu 2)(A) = \sum \mu 1(B) \cdot \mu 2(C) \text{ where} \quad (1)$$
$$A, B, C, \subseteq \{t1, t2, d1, d2\}$$
$$B \cap C = \{\}$$
$$A = B \cup C$$

Therefore, to automatically determine the coarse partition for some information source i, a sum of conflict mass over all $j \neq i$ must be calculated as shown in equation (2).

$$c_i = \sum_{j \neq i} \mu_i \star \mu_j \quad (2)$$

This yields the conflict mass on various subsets of the choice set. For each information source chosen the subset with the largest conflict mass will be chosen as the coarse set. For example, in the previously introduced information source 1, d1 and d2 have the most conflict. Therefore, the choice set for information source 1 will be {{d1, d2}, {t1}, {t2}}. Alternatively, variations on choosing the coarse set may include multiple disjoint subsets with large conflict mass used as coarse sets, or the union of multiple intersecting subsets with large conflict mass as a larger coarse set. A multi-level hierarchy of coarse sets may also be used.

When feature or information source histograms or probability densities are known a priori, an alternative to equation (2) is to use each feature's cross correlation matrix to determine the coarsening set. In particular:

$$\underline{C_i}[a, b] = \sum_{a,b} \vec{P_a^T} \vec{P_b} \quad (3)$$

$\underline{C_i}$ is the cross correlation matrix for the feature i, and a and b are probability densities for the $a^{th}$ and the $b^{th}$ members of feature i's choice set. In equation (3) "T" denotes transpose, $\vec{P}_a{}^T \vec{P}_b$, and is the dot product of vectors a and b. The coarse set is chosen as $\{\alpha, \beta\}$ where $\underline{C_i}[\alpha, \beta]$ is the maximum element of $\underline{C_i}$ such that $\alpha \neq \beta$. The intuition is that similar choices (e.g., t1 and t2) will have similar signatures ($\vec{P}_{t1}$ and $\vec{P}_{t2}$) and will usually have a large dot product ($\vec{P}_{t1}{}^T \vec{P}_{t2}$). Similar signatures may lead to confusion and hence conflict. The method represented by equation (3) has a large computational advantage over equation (2).

Block 130 performs coarsening, which is known in the art, on each distribution in the fine choice set, thereby generating a coarse distribution and a vacuous distribution from each fine distribution, as shown in equations (4a) to (4c). Note, a vacuous distribution is a distribution in which all mass is devoted to the entire set of elements. The vacuous distribution is a representation of total ignorance.

$$\mu^c(B \cup A) = \sum \mu^f(B) \quad (4a)$$
$$A \subseteq W$$
$$B \subseteq W$$
$$B \cap A \neq \emptyset$$
$$A \text{ is the coarse set}$$

$$\mu^c(B) = 0, \text{ if } B \cap A \neq \emptyset, B \cup A \neq B, \text{ for all } B \in 2^W \quad (4b)$$

$$\mu^c(C) = \mu^f(C), \text{ if } C \cap A = \emptyset, \text{ for all } C \in 2^W \quad (4c)$$

Note that $\mu^c$, $\mu^f$, and $\mu^v$ represent coarse, fine, and vacuous bpa's respectively, while W is the set containing all of the fine elements in the choice set. In equation (4a) set B intersects partition element A, and the original value $\mu^f(B)$ is shifted from a smaller set, B in $\mu^f$, to a larger set, A$\cup$B in $\mu^c$. Therefore the coarsening operation in equation (4a) causes $\mu^f$ to lose a degree of specificity (it becomes more coarse). In equation (4b), B also intersects A, and $\mu^f(B)$ has been moved to $\mu^c(B \cup A)$. Thus $\mu^c(B)$ is set to zero. Equation (4c) addresses the situation wherein sets C and A do not intersect.

After a coarsening has been performed on each bpa in the fine choice set, block 140 performs linear superposition for each feature. That is, a particularly useful feature of the fine, coarse, and vacuous bpa's is that they can be linearly superimposed to form another valid distribution as shown in equation (5).

$$\mu = f \cdot \mu^f + c \cdot \mu^c + v \cdot \mu^v \quad (5)$$

where f+c+v=1, and $0 \leq f, c, v \leq 1$

Where f, c, and v are weights placed on fine, coarse, and vacuous distributions, respectively. Note that these weights may be manipulated to improve performance. Thus the statistical classifier disclosed herein may be trained to achieve improved performance through the manipulation of the weights on the extended bpa's. After the linear superposition of each information source has been completed, block 150 performs the function of combining all coarsened reports to reach a conclusion based on the data presented by information sources.

When the distributions of each information source are coarsened, as described, prior to linear combination as shown in equation (5), the overall performance of the statistical classifier is improved. Improvements will be noted in the ability of the statistical classifier to discriminate between objects or targets. Improvements in the robustness of the classifier will also be noted. That is, the classifier will be less sensitive to data distortion, thus yielding more accurate and consistent results.

Again consider three bpa's $\mu 1$, $\mu 2$, and $\mu 3$. The bpa $\mu 1$ may be based on object shape, $\mu 2$ may be based on object size, while a third bpa $\mu 3$ may be based on the heat associated with the object. When an object is observed, two information sources that produce bpa's may not agree. In traditional systems disagreement results in conflict accumulation and degradation in classification performance. The present invention examines the sources of information to find sources that have the most conflict between them. Coarsening is then performed on the sources of information having the most conflict. For example, $\mu 1$ may indicate that the observed object is target t1 and $\mu 2$ may indicate that the observed object is target t2. Through the examination of $\mu 1$ and $\mu 2$ it is determined that conflict is reduced by stating that the observed object is a target. Note that the statement that the object is a target is more coarse than the statement that the object is either target t1 or target t2. By coarsening the level at which information is viewed conflict may be reduced. The reduction of conflict leads to superior performance of statistical classifiers.

Of course, it should be understood that a range of changes and modifications can be made to the preferred embodiment described above. For example, one could approximate the calculations previously described in the Bayesian calculus and expect some improvement over traditional Bayes classifiers. Additionally, a measurement of correlation between information sources may be used to determine the coarse set of information sources. Information sources having high correlations are likely to be confused and thus have the most conflict. Objects that have high correlations to one another are placed in the coarsening set. This alternate method of determining the coarse set is computationally inexpensive. It is therefore intended that the foregoing detailed description be regarded as illustrative rather than limiting and that it be understood that it is the following claims, including all equivalents, which are intended to define the scope of this invention.

What is claimed is:

1. A method for statistical classification in target recognition, comprising the steps of:

gathering sets of information representative of features of a target;

creating basic probability assignments based on said sets of information;

determining a coarse information set from elements in a choice set;

performing coarsening on said sets of information;

performing linear superposition on each information source; and combining information representative of said features to reach a conclusion regarding the target.

2. The method of claim 1 wherein said sets of information comprise sensor outputs.

3. The method of claim 1 wherein said sets of information comprise rules.

4. The method of claim 1 wherein said coarse information set is defined by selecting said elements in said choice set having the most conflict.

5. The method of claim 4 wherein said choice set having said most conflict is determined through the use of a conflict operation.

6. The method of claim 4 wherein said choice set has said highest correlation.

7. The method of claim 1 wherein said step of linear superposition includes making a combination of fine, coarse, and vacuous basic probability assignments, each of said basic probability assignments having a coefficient.

8. The method of claim 7 wherein said coefficients may be manipulated to improve classification performance.

9. A method for statistical classification to resolve conflicting sets of information about an object, comprising the steps of:

gathering sets of information representative of features of an object;

creating basic probability assignments based on sail sets of information;

determining a coarse information set from elements in a choice set;

performing coarsening on said sets of information;

performing linear superposition on each information source; and combining information representative of said features to reach a conclusion regarding the object.

* * * * *